(12) United States Patent
Depraz et al.

(10) Patent No.: US 12,742,893 B2
(45) Date of Patent: Sep. 22, 2026

(54) DEVICE FOR DETERMINING THE ATTITUDE OF A CARRIER, AND ASSOCIATED SYSTEM FOR ASSISTING WITH THE PILOTING OF A CARRIER AND DETERMINATION METHOD

(71) Applicant: THALES, Courbevoie (FR)

(72) Inventors: David Depraz, Valence (FR); Christian Mehlen, Valence (FR)

(73) Assignee: THALES, Courbevoie (FR)

( * ) Notice: Subject to any disclaimer, the term of this patent is extended or adjusted under 35 U.S.C. 154(b) by 316 days.

(21) Appl. No.: 18/263,247

(22) PCT Filed: Jan. 28, 2022

(86) PCT No.: PCT/EP2022/052005
§ 371 (c)(1),
(2) Date: Jul. 27, 2023

(87) PCT Pub. No.: WO2022/162123
PCT Pub. Date: Aug. 4, 2022

(65) Prior Publication Data
US 2024/0077624 A1 Mar. 7, 2024

(30) Foreign Application Priority Data
Jan. 29, 2021 (FR) ..................................... 21 00864

(51) Int. Cl.
*G01S 19/55* (2010.01)
*G01S 19/36* (2010.01)

(52) U.S. Cl.
CPC .............. *G01S 19/55* (2013.01); *G01S 19/36* (2013.01)

(58) Field of Classification Search
CPC ................................ G01S 19/55; G01S 19/36
(Continued)

(56) References Cited

U.S. PATENT DOCUMENTS 5,574,467 A 11/1996 Saunders
6,593,879 B1 * 7/2003 Campbell ............... G01S 19/53 342/357.65

(Continued)

FOREIGN PATENT DOCUMENTS

CN 108802789 A * 11/2018 ............. G01S 19/55
CN 110849358 A 2/2020

(Continued)

OTHER PUBLICATIONS

International Search Report for PCT/EP2022/052005 dated Apr. 26, 2022.

(Continued)

*Primary Examiner* — Samarina Makhdoom
(74) *Attorney, Agent, or Firm* — B. Aaron Schulman, Esq.; Stites & Harbison, PLLC

(57) ABSTRACT

The present invention relates to a device (16) for determining the attitude of a carrier comprising a GNSS receiver apt to receive GNSS signals from one or a plurality of antennas (14) arranged in known positions;

the determination device (16) comprising:

- a movement generation module (22) configured for generating a movement of an apparent phase center according to a control law;
- a control module (23) configured for determining the control law;
- a determination module (24) configured for determining an absolute orientation of a vector of interest from at least one observable value supplied by the GNSS receiver (12) and from the control law, and for determining at least one component of the attitude of the carrier from the absolute orientation of the vector of interest.

12 Claims, 4 Drawing Sheets

(58) Field of Classification Search
USPC .................................................... 342/357.38
See application file for complete search history.

(56) References Cited

U.S. PATENT DOCUMENTS

| | | | | |
|---|---|---|---|---|
| 9,417,330 | B2 | 8/2016 | Revol et al. | |
| 9,612,342 | B2 | 4/2017 | Petersen | |
| 2005/0012664 | A1* | 1/2005 | Gerein | G01S 19/40 701/469 |
| 2011/0050497 | A1* | 3/2011 | Maenpa | G01S 19/23 342/368 |
| 2013/0241768 | A1 | 9/2013 | Petersen | |
| 2013/0328718 | A1* | 12/2013 | Frey, Jr. | G01S 19/54 342/357.42 |
| 2013/0335264 | A1* | 12/2013 | Revol | G01S 19/22 342/357.25 |

FOREIGN PATENT DOCUMENTS

| | | | | |
|---|---|---|---|---|
| EP | 1775599 | | 4/2007 | |
| EP | 1775599 | A1 * | 4/2007 | G01S 5/0247 |

OTHER PUBLICATIONS

Preliminary Search Report for FR 2100864 dated Dec. 14, 2021.
Belokonov I V et al. "Estimation of the nanosatellite attitude and angular rate by analyzing the navigation spacecraft geometrical visibility using the controllable pattern of navigation antenna", 2017 24th Saint Petersburg International Conference on Integrated Navigation Systems (ICINS), Concern CSRI Elektropribor, JSC, (May 29, 2017), pp. 1-4.
New Single Antenna GPS attitude measurement system, cited in Chinese equivalent application Feb. 2, 2026.

* cited by examiner

DEVICE FOR DETERMINING THE ATTITUDE OF A CARRIER, AND ASSOCIATED SYSTEM FOR ASSISTING WITH THE PILOTING OF A CARRIER AND DETERMINATION METHOD

FIELD OF THE INVENTION

The present invention relates to a device for determining the attitude of a carrier.

The present invention also relates to a system for assisting the piloting of a carrier and to a method for determining the attitude of the carrier, associated with the determination device.

The field of the invention is the field of GNSS receivers.

More particularly, a GNSS receiver refers to a receiver used for receiving GNSS signals, i.e. signals coming from one or a plurality of Global Navigation Satellite Systems and, from such signals, for determining a navigation solution comprising, the position and the speed.

The field of application of the invention is the field of controlling the piloting of a carrier and in particular, controlling the attitude of such a carrier. In a manner known per se, the attitude of a carrier includes the heading, the roll and the pitch of the carrier.

BACKGROUND OF THE INVENTION

In the prior art, there are already many devices for determining the attitude of a carrier.

Among such devices, methods for determining the attitude using a GNSS receiver are known, according to which the receiver analyzes the GNSS signals received by a set of antennas, so as to measure the carrier phase difference and deduce therefrom the orientation of the antenna base.

However, such methods use GNSS receivers with a specific design, which are generally more complex and less widespread than GNSS receivers providing the location service alone. Such receivers with specific design indeed interface with a plurality of antennas, either by a parallel treatment of the antenna signals or by a sequential treatment of the antennas. In the second type of solution, the receiver successively connects the radio frequency input thereof to each antenna via a fast electronic switch, and analyzes the snippets of received signals, so as to measure the carrier phase difference between the antennas.

SUMMARY OF THE INVENTION

The goal of the present invention is to propose a device for determining the attitude of a carrier which works with a GNSS receiver provided with the location service alone.

To this end, the goal of the invention is a device for determining the attitude of a carrier, the carrier comprising a GNSS receiver apt to receive GNSS signals from one or a plurality of antennas arranged in known positions with respect to the carrier and defining an apparent phase center, the GNSS receiver being apt to supply an observable value determined from the received GNSS signals.

The determination device comprises a movement generation module, configured for generating a movement of the apparent phase center according to a predetermined control law; a control module configured for determining the control law; a determination module configured for determining an absolute orientation of a vector of interest from at least one observable value provided by the GNSS receiver and the control law determined by the control module, and the determination module being further configured for determining at least one of the observable values a component of the attitude of the carrier, from the absolute orientation of the vector of interest determined.

According to other advantageous aspects of the invention, the determination device comprises one or a plurality of the following features, taken individually or according to all technically possible combinations:

- the vector of interest is obtained by measuring the amplitude of the modulation of the observable value, the modulation of the observable value being caused by the periodic setting in movement of the apparent phase center;
- the observable value comprises at least one, preferentially two and advantageously three, of the geographical velocity coordinates provided by the GNSS receiver;
- when the carrier comprises at least two antennas, the movement generation module is a switch apt to switch the transmission to the GNSS receiver of the signals received by the antennas, in order to generate an electrical movement of the apparent phase center according to the control law;
- when the carrier comprises two switched antennas, the control law is a square signal;
- the movement generation module is apt to control at least one mechanical actuator of the carrier and/or of the or each antenna, so as to generate a mechanical movement of the apparent phase center according to the control law;
- said component of the attitude of the carrier corresponds to the heading angle, to the roll angle or to the pitch angle of the carrier;
- the control law defines a displacement of the apparent phase center along a longitudinal axis of the carrier when the determination of the heading and pitch angles is necessary;
- the control law defines a displacement of the apparent phase center along a transverse axis of the carrier when the determination of the roll angle is necessary;
- the vector of interest corresponds to the absolute direction of displacement of the apparent phase center;
- when the observable value is a measurement of the resolved velocity of the carrier, the vector of interest is determined from the following relationship:

$$\delta V = b(t) \cdot (d_X, d_Y, d_Z)^T$$

where $\delta V$ is a resolved velocity deviation vector;

$b(t)$ is a function dependent on the control law;

$(d_X, d_Y, d_Z)^T$ is the vector of interest.

A further subject matter of invention a system for assisting with the piloting of a carrier, comprising:

- a GNSS receiver apt to provide an observable value;
- one or a plurality of antennas arranged in known positions with respect to the carrier and defining an apparent phase center;
- a device for determining the attitude of the carrier, as described above.

A further subject matter of the invention is a method for determining the attitude of a carrier, the carrier comprising a GNSS receiver apt to receive GNSS signals from one or a plurality of antennas arranged in known positions with respect to the carrier and defining an apparent phase center, the GNSS receiver being apt to supply an observable value determined from the received GNSS signals;

the method comprising:

determination of a control law of the apparent phase center;

setting in movement of the apparent phase center according to the control law;

determination of an absolute orientation of a vector of interest from at least one observable value provided by the GNSS receiver and from the control law;

determination of at least one component of the attitude of the carrier, from the absolute orientation of the determined vector of interest.

DESCRIPTION OF THE DRAWINGS

The features and advantages of the invention will appear upon reading the following description, given as an example, but not limited to, and making reference to the enclosed drawings, wherein.

DETAILED DESCRIPTION OF THE INVENTION

Figure 1:
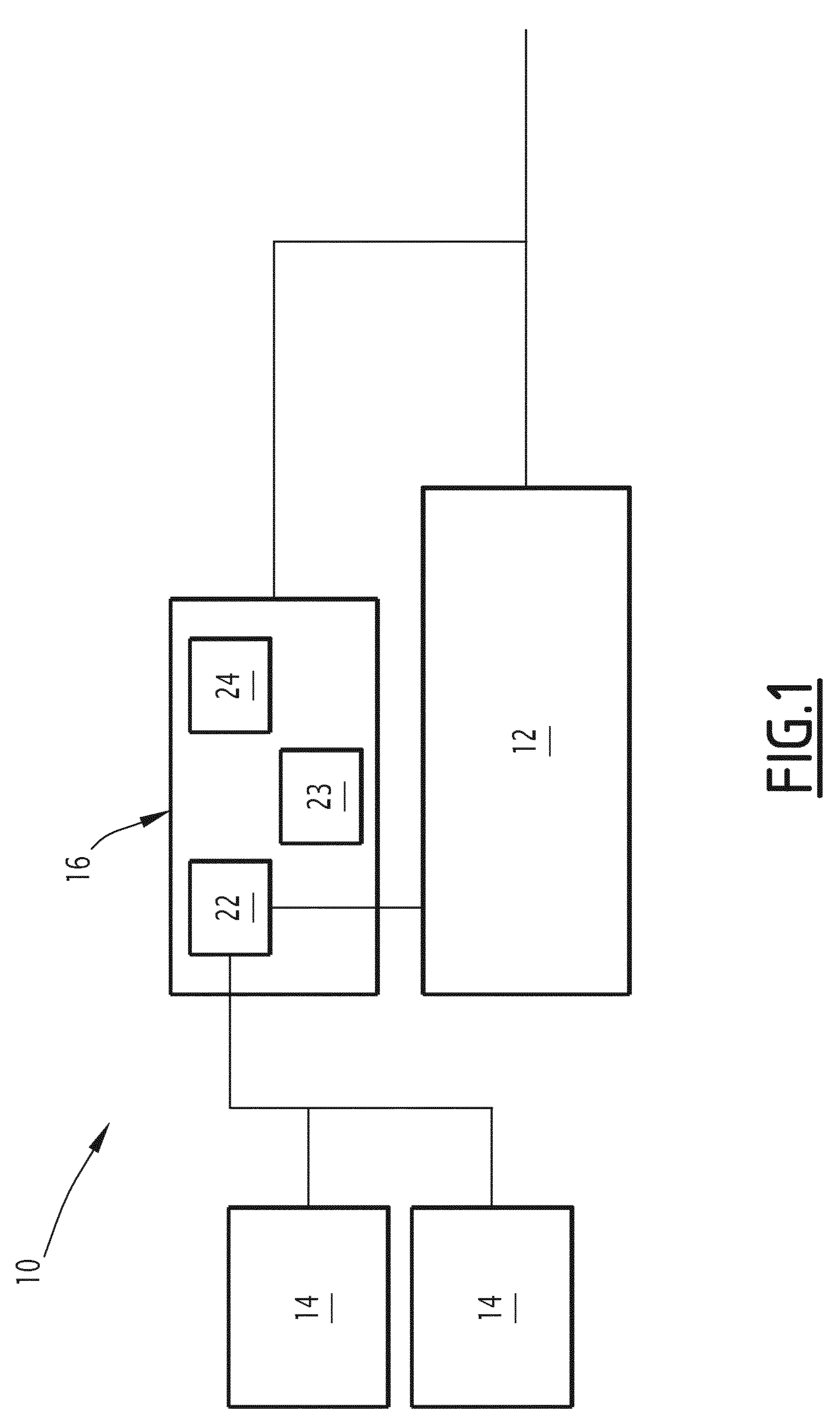
FIG. 1 is a schematic view of a system for assisting with the piloting of a carrier according to the invention, the system comprising in particular a determination device according to the invention and two antennas, in the example of said figure.

The system for assisting with the piloting 10 shown in FIG. 1 is used for geolocating a carrier wherein the system is on-board, and for determining the attitude of the carrier. Such information can e.g. be used by a pilot, so as to pilot the carrier at least partially manually and/or by an avionic system, so as to pilot the carrier at least partially automatically.

The carrier is e.g. an aircraft, such as a drone, moving in space in three dimensions, or a land or sea vehicle moving in a plane in two dimensions or e.g. a railway vehicle moving along one direction along a railway track.

The carrier defines a coordinate frame associated with the body thereof. The orientation of the coordinate frame with respect to a fixed coordinate frame, e.g. a terrestrial coordinate frame, then defines the attitude of the carrier. The orientation can be described by three angles known in the prior art as heading, roll and pitch.

The carrier further defines a longitudinal axis, about which the rotation generating the roll angle is defined, and transverse and normal axes perpendicular to the longitudinal axis.

The system for assisting with piloting 10 comprises a GNSS receiver 12, one or a plurality of antennas 14 and a determination device 16.

The or each antenna 14 is known per se and in particular and is used for receiving GNSS signals from one or a plurality of global satellite positioning systems, such as e.g. the GPS, Galileo or GLONASS.

More particularly, as is known per se, the or each antenna 14 defines a phase center and is placed in a known position with respect to the carrier.

In the coordinate frame of the carrier, the position of the or each antenna 14 is thereby known at all times. The above means in particular that the positions of the phase center of the or each antenna 14 are also known in the same coordinate frame.

The number of antennas 14 is chosen according to the embodiments described in detail thereafter.

More particularly, according to a first embodiment (not illustrated in the figures), only one antenna 14 is used. In the coordinate frame of the carrier, the antenna 14 can be either mobile or fixed. When the antenna 14 is mobile, same is e.g. mounted on an actuator provided for this purpose.

According to such example of embodiment, the term "apparent phase center" used hereinafter refers to the phase center of the antenna 14.

According to a second embodiment (illustrated in the figures), a plurality of antennas 14 are used. Each of the antennas 14 has e.g. a fixed antenna in the coordinate frame of the carrier.

According to such example of embodiment, the term "apparent phase center" refers to the phase center of the antenna 14 active at a given instant or when a plurality of antennas are active at the same instant and the signals coming from the antennas are superimposed, the phase center obtained after the superposition of the phase centers of the active antennas 14.

In the example shown in FIG. 1, two antennas 14 are illustrated.

Figure 2:
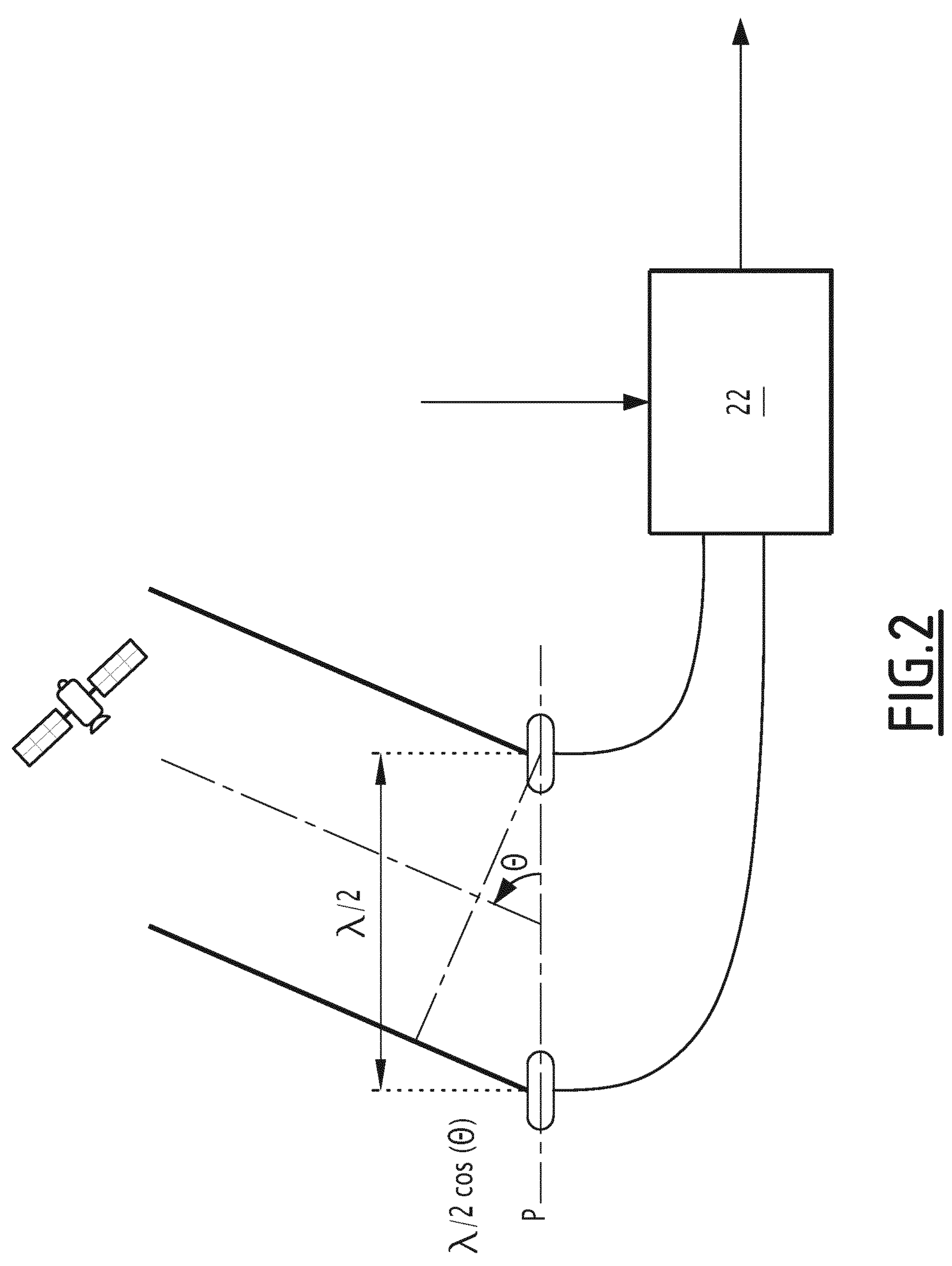
FIG. 2 is a schematic view of the arrangement of the antennas shown in FIG. 1.

The respective positions of the antennas 14 are shown in more detail in FIG. 2.

More particularly, in the example shown in FIG. 2, the antennas 14 are placed in the same plane P.

Furthermore, the antennas 14 are separated from each other by half the wavelength of the GNSS signals.

The above means that the antennas 14 are separated from each other by about ten centimeters.

It is possible to move the antennas 14 away from each other along another distance. Preferentially, such a distance is less than one wavelength of the GNSS signals.

Such distance between a pair of antennas 14 will be denoted hereinafter by d. In the example of FIG. 2, $d=\lambda/2$.

In general, in the embodiment using a plurality of antennas, the relative positions of the antennas with respect to each other and with respect to the carrier, are known.

It is thus understood that in one embodiment, the trajectory of the phase center in the frame of reference of the carrier is obtained by applying a mechanical displacement of only one antenna along a controlled path, and that in another embodiment the latter is obtained by successively switching a plurality of antennas, the position of which is known in the frame of reference of the carrier, and according to a controlled order and duty ratio.

The GNSS receiver 12 is known per se. It is a location service which provides measurements of the position of the carrier, in the form of three coordinates in the geographical coordinate frame, and measurements of the velocity of the carrier, in the form of three coordinates in the geographical coordinate frame, from the observation of the signals received from only one antenna. Same can also provide pseudo-distance and pseudo-velocity measurements for each of the tracked satellites. Thereafter, the different types of measurements are called observable values.

The observable values are determined in a way known per se, in particular by applying filtering of the signals received from the antenna, by making correlations and other types of treatment of the signals.

More particularly, the receiver 12 is connected either to the antenna 14 alone, when the antenna is associated with a movement generation device, or with a module 22 (explained in detail hereinbelow) of the antennas 14 when there is a plurality of antennas, as can be seen in FIG. 1.

The determination device 16 is used for determining the attitude of the carrier by analyzing in particular the observable value coming from the GNSS receiver 12. The attitude of the carrier is determined under the assumption that GNSS signals propagate along direct paths. In other words, the attitude is determined under the assumption that multipaths, i.e. spurious signals due to specular reflection of satellite signals, are substantially absent or negligible. Such is the case in particular when the carrier moves above a certain altitude or in an open environment, e.g. in an environment outside the urban environment.

With reference to FIG. 1, the determination device 16 comprises a movement generation module 22, a control module 23 and a determination module 24.

Each of the modules 23 and 24 is e.g. in the form of software implemented by a suitable computer and/or at least partially in the form of a hardware component, e.g. in the form of a programmable logic circuit of the FPGA (standing for "Field-Programmable Gate Array") type.

The movement generation module 22 is used for generating a movement of the apparent phase center of the antenna or antennas 14 according to a predetermined control law.

The movement generation module 22 can be further used for receiving the signals received by the or each antenna, so as to transmit same to the receiver 12. Moreover, in the case of a plurality of antennas, the module 22 is used for combining the signals received before transmitting same to the receiver 12.

According to the first embodiment, i.e. when the system 10 comprises only one antenna 14, the movement generated by the module 22 is mechanical.

In other words, in such case, the movement generation module 22 is used for controlling either the mechanical actuator on which the antenna 14 is mounted when the antenna is mobile or at least one actuator of the carrier as such, for moving the carrier when the antenna is fixed. In a variant, when the antenna is mobile, the movement generation module 22 is used for simultaneously controlling the actuator of the antenna and at least one actuator of the carrier.

According to the second example of embodiment, i.e. when the system 10 comprises at least two antennas 14, the movement generation module 22 is apt to generate a movement of the apparent phase center of the antennas 14 in an electrical way.

In other words, in such case, the physical positions of the antennas 14 are not modified but the transmission of the GNSS signals received by the antennas is switched according to the control law.

In such case, the movement generation module 22 can then take the form of an electronic radio frequency multiplexer "N inputs to one output", with N being the number of antennas, and the single output being connected to the antenna assigned by the control applied to the multiplexer.

The control module 23 can be used for determining the control law. Such law is determined according to the desired movement of the apparent phase center of the antenna or antennas 14.

More particularly, if the heading and pitch angles are of interest, the movement of the apparent phase center should be along the longitudinal axis of the carrier.

If the roll angle is of interest, the movement should be along the transverse axis of the carrier.

If the three angles are of interest, then the movement will have to move along both longitudinal and transverse axes.

In the case where the movement of the phase center is generated electrically, two antennas 14 are sufficient for determining at least two components of the attitude of the carrier such as e.g. the heading and the pitch, and three antennas 14 are sufficient for determining each component of the attitude of the carrier.

Furthermore, the control law is chosen according to the nature of the movement generated by the movement generation module 22.

E.g., when it is a matter of a movement obtained by electronic switching of two antennas, the control law presents e.g. a scalar signal, taking two values—selection of the first antenna and selection of the second antenna,—in a pseudo-random way at a frequency of a few Hz. The switching frequency is chosen to be sufficiently fast with respect to the passband of the variations of attitude variations which are desired to be observed, and sufficiently slow with respect to the passband of the tracking loops of the receiver. The choice of the switching duty cycle—fixed duty cycle sequence or pseudo-random sequence—can be used for decoupling the natural movement from the observable value and the controlled movement from the observable value. The observable value contains the effects of these two movements: e.g., if the observable value is the geographic velocity vector, the vector carries the changes of velocity caused by the trajectory of the carrier and the changes of velocity caused by switching the antennas. Only the second component carries the attitude information which is herein sought to be known.

Moreover, according to the features of the apparent movement of the antenna and the nature of the GNSS signals used, the presence of such movement might compromise certain functions of the receiver, such as the demodulation of the data transmitted on certain components of the GNSS signal or the functioning at a low signal-to-noise ratio. It could then be advantageous to stop the movement of the antenna during certain phases of the mission or to activate same by a snippet of time.

Thereby, the parameters of the control law c(t)—movement with one or two degrees of freedom, frequency of repetition of the movement, variably regular sequencing, continuous operation or by snippet—set the service rendered, the performance thereof and the complexity of the device 16: provision of two or three angles of attitude, tolerance to a variable dynamics of variation of attitude of the carrier, tolerance to the variable dynamics of the trajectory of the carrier, service rendered continuously or during certain phases of the mission. Such parameters are also chosen as a function of certain characteristics of the GNSS receiver used, such as the bandwidth of the GNSS signal tracking loops thereof, which can significantly change from one manufacturer to another.

In general, the control law c(t) is thus chosen so as to be able to separate the variations in the geographical speed caused by the trajectory of the carrier and the variations caused by the setting in movement of the apparent phase center.

According to a particular example of the invention, the control law c(t) is a square signal which, e.g. in the case of two antennas, alternately activates and deactivates each of the antennas according to a predetermined frequency.

The determination module 24 is configured for determining the orientation of the carrier from the observable value determined by the GNSS receiver 12 and from the control law determined by the control module 23.

Figure 3:
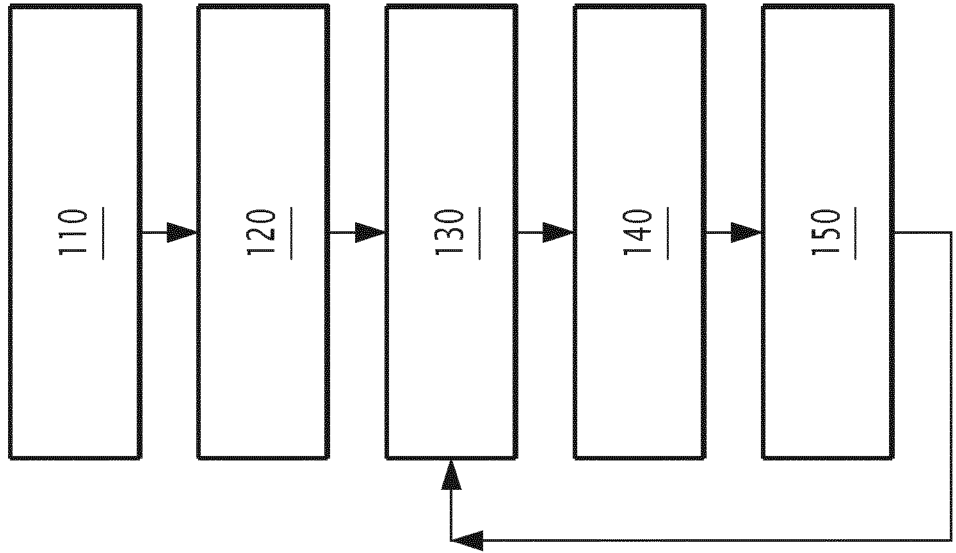
FIG. 3 is a flowchart of a determination method used by the determination device shown in FIG. 1.
Figure 3:
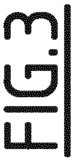
Figure 4:
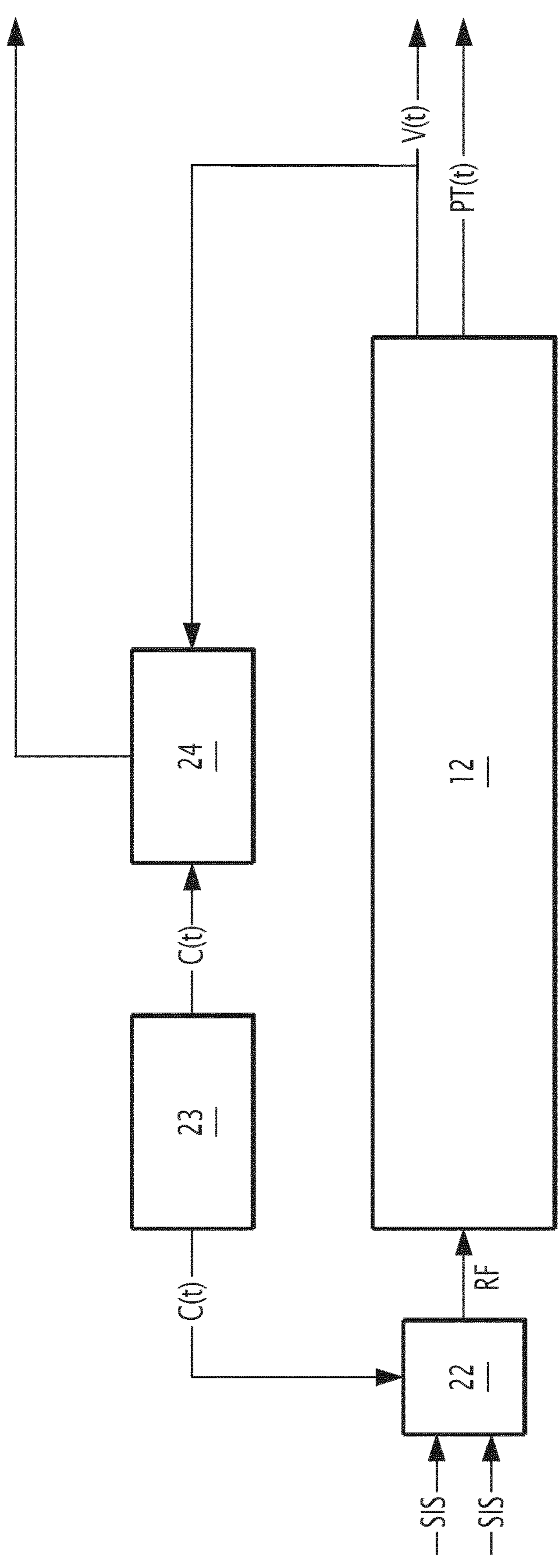
FIG. 4 is a schematic view explaining the functioning of the determination device shown in FIG. 1.

The determination implemented by the determination device 16 according to the invention will henceforth be explained with reference to FIG. 3 which shows an flowchart of the method and to FIG. 4 which explains the functioning of the device 16. As explained hereinabove, advantageously, the method is implemented under the assumption that the GNSS signals propagate along direct paths.

During an initial step 110, the control module 23 determines a control law c(t).

As explained hereinabove, the control law c(t) is determined according to the desired movement of the apparent phase center and to the nature of the movement generation module 22.

The step 110 is e.g. implemented prior to the use of the system 10 in the carrier.

The following steps are implemented when the GNSS receiver 12 is in operation and determines the observable value and the position of the carrier PT.

More particularly, during the step 120, the movement generation module 22 sets the apparent phase center in movement according to the control law c(t) determined by the control module 23.

During the next step 130, the determination module 24 acquires the observable value coming from the GNSS receiver 12, which then varies in particular according to the control law c(t).

To simplify the description thereafter, it will be considered that the observable value is the velocity $\vec{V}$ resolved by the GNSS receiver 12.

To simplify the description, it will also be considered hereinafter that the resolution of the two angles of heading and pitch is of interest. Obtaining the two angles is equivalent to obtaining the unit vector carried by the longitudinal axis of the carrier.

To simplify the description, it will also be considered hereinafter that the movement of the controlled phase center is obtained by switching two antennas separated by a known distance d and positioned along the longitudinal axis of the carrier. It will thus be understood that the resolution of the two angles, heading and pitch, is equivalent to obtaining the three coordinates in the geographical coordinate frame of the vector $\vec{d}$ separating the two antennas, hereinafter called the vector of interest. In the case of only one mobile antenna, the vector $\vec{d}$ corresponds to the displacement vector of the apparent phase center which then heads either along the longitudinal axis of the carrier (when the heading and pitch angles are needed) or along the transverse axis of the carrier (when the roll angle is needed).

During the next step 140, the determination module 24 determines the vector $\vec{d}$, in the way discussed in detail hereinafter.

The velocity and the velocity increased by a fourth line containing the value DH signifying the clock drift of the GNSS receiver 12 with respect to the clock of the GNSS system considered:

$$\vec{V}=(V_X,V_Y,V_Z)^T$$

$$\vec{V^+}=(V_X,V_Y,V_Z,DH)^T$$

It is known that the GNSS receiver 12 usually calculates the vector $V^+$ from a least squares calculation applied to the N pseudo-velocity measurements obtained for each of the GNSS satellites tracked and which are denoted herein by $PRR_1$, $PRR_2$, . . . , $PRR_N$.

Denoting by H the observation matrix of dimension N×4, containing on the k-th line, the three coordinates of the view axis vector $\overrightarrow{los_k}$ and a "1", and denoting by Z, the vector formed by the N measurements of pseudo-velocity:

$$\vec{Z}=(PRR_1,PRR_2,\ldots PRR_N)^T$$

it is known that the relationship which describes how a small variation of the vector Z, denoted by δZ, entails a small variation of the vector $V^+$, denoted by $\delta V^+$, is as follows:

$$\overrightarrow{\delta V^+}=(H^T\cdot H)^{-1}\cdot H^T\cdot\overrightarrow{\delta Z} \quad \text{(Rel 1)}.$$

More particularly, axis vector $\overrightarrow{los_k}$ related to the k-th satellite refers to the unit vector containing the three coordinates of the segment joining the carrier to the satellite.

It is also known that the difference of travel, expressed in meters, between the path followed by the signal transmitted by the k-th satellite and received by the first antenna, and the path followed by the signal transmitted by the k-th satellite and received by the second antenna at the same instant, is written as the scalar product between the vector $\vec{d}$ and the vector $\overrightarrow{los_k}$ $$ddm_k=\overrightarrow{los_k}*\vec{d}.$$

If the control c(t) switches the two antennas in a way equal to the period T expressed in seconds, and the tracking loop of the receiver restores the main frequency component of such movement, then the preceding causes a quasi-sinusoidal variation of the pseudo-velocity measured by the receiver which has the form:

$$\delta PRR_k = \frac{d}{dt}\left(\frac{2}{\pi}\cdot ddm_k\cdot\sin\left(\frac{2\pi}{T}\cdot t\right)\right)=\frac{4}{T}\cdot\cos\left(\frac{2\pi}{T}\cdot t\right)\cdot ddm_k \text{ expressed in m/s.}$$

the quantity 2/π being the amplitude of the main sinusoidal component in the harmonic composition of a square periodic signal of unit amplitude.

More generally, b(t) denotes the function which modulates the measurement of pseudo-velocity:

$$\delta PRR_k=b(t)\cdot ddm_k \text{ expressed in m/s.}$$

The function b(t) depends on the control c(t) and on the passband of the signal tracking loop inside the receiver: if the movement of the phase center is too fast, the passband of the receiver will tend to reduce too much the amplitude of the effect induced by the control on the pseudo-velocity. Which is not the effect sought by the device.

By applying the above relations in relation 1, and taking into account that the control c(t) has the same effect on all the satellites tracked, one obtains:

$$\overrightarrow{\delta V^+}=(H^T\cdot H)^{-1}\cdot H^T\cdot b(t)\cdot[\overrightarrow{los_1}*\vec{d},\overrightarrow{los_2}*\vec{d},\ldots\overrightarrow{los_N}*\vec{d}]^T$$

By denoting by $\vec{d^+}$ the vector $\vec{d}$ increased by a fourth line to 0, the above relation becomes:

$$\overrightarrow{\delta V^+}=(H^T\cdot H)^{-1}\cdot H^T\cdot b(t)\cdot H\cdot\vec{d^+}$$

Then, $$\overrightarrow{\delta V^+}=b(t)\cdot(H^T\cdot H)^{-1}\cdot H^T\cdot H\cdot\vec{d^+}$$

Then, $\vec{\delta V^+}=b(t)\cdot\vec{d^+}$

Finally, keeping only the first 3 lines of the vectors:

$\vec{\delta V}=b(t)\cdot\vec{d}$

It is thereby understood that the observable value, the geographical velocity produced by the receiver 12 in the example hereinabove, is modified by the application of the control, and that the modification $\vec{\delta V}$ carries the vector of interest $\vec{d}$ modulated by the signal b(t) defined by the control signal c(t) and the known passband of the receiver 12.

The vector of interest $\vec{d}$ is then obtained during the step 140 by eliminating the modulating function b(t) in the relation hereinabove. In the example where the command c(t) is a square signal, the function b(t) is then a pseudo-sinusoidal signal the frequency of which is the frequency of c(t). The work of the step 140, in order to access the three coordinates of the vector $\vec{d}$, consists then in measuring the amplitude of the sinusoidal component, the frequency of which is known, over the three coordinates of the velocity.

Once the three coordinates of the vector of interest $\vec{d}$ are known, the step 150 deduces therefrom the heading C and the pitch angles T, in a known way, e.g. considering the North, East and Vertical coordinates:

$$C = a\cos\frac{d_{north}}{\sqrt{d_{north}^2 + d_{east}^2}}$$

$$T = a\sin\frac{d_{vertical}}{\sqrt{d_{north}^2 + d_{east}^2 + d_{vertical}^2}}.$$

At the end of the step 150, the determination module 24 transmits the determined component or components e.g. to another avionic system and/or displays same to the pilot. The steps 130 to 150 can then be repeated for updating the attitude of the carrier.

In this way, it can be understood that the present invention has a certain number of advantages.

More particularly, the invention can be used for determining the attitude of a carrier by using a GNSS receiver provided with the location service alone and setting the phase center in movement according to a known law. Unlike GNSS receivers specially designed for supplying a service of determination of attitude from a plurality of antennas, receivers equipped with the location service alone, and thus managing only one antenna, are widely used in many fields of application.

The invention claimed is:

1. A device for determining the attitude of a carrier, the carrier comprising a GNSS receiver apt to receive GNSS signals from one or a plurality of antennas arranged in known positions with respect to the carrier and defining an apparent phase center, the GNSS receiver being apt to supply an observable value determined from the received GNSS signals;

the determination device comprising:

a movement generation module configured for generating a movement of the apparent phase center according to a predetermined control law;

a control module configured for determining the control law;

a determination module configured for determining an absolute orientation of a vector of interest from at least one observable value supplied by the GNSS receiver and from the control law determined by the control module;

wherein the determination module is further configured for determining at least one component of the attitude of the carrier, from the absolute orientation of the determined vector of interest;

wherein the movement generation module is configured to generate the movement of the apparent phase center by:

(i) controlling at least one mechanical actuator of the carrier and/or of at least one antenna to physically displace the apparent phase center according to the control law, or (ii) controlling an electronic radio-frequency multiplexer having a plurality of antenna inputs and a single output, the output being connected to the antenna assigned by the control law; and wherein when the observable value is a measurement of the resolved velocity of the carrier, the vector of interest is determined from the following relationship:

$\delta V=b(t)\cdot(d_X,d_Y,d_Z)^T$ where

δV is a resolved velocity deviation vector;

b(t) is a function dependent on the control law;

$(d_X,d_Y,d_Z)^T$ is the vector of interest.

2. The determination device according to claim 1, wherein the vector of interest is obtained by measuring the amplitude of a modulation of the observable value, said modulation of the observable value being caused by a periodic setting in movement of the apparent phase center.

3. The determination device according to claim 1, wherein the observable value comprises at least one of the geographic velocity coordinates provided by the GNSS receiver.

4. The determination device according to claim 1, wherein, when the carrier comprises at least two antennas, the movement generation module is a switch apt to switch the transmission to the GNSS receiver of the signals received by the antennas, so as to generate an electrical movement of the apparent phase center according to the control law.

5. The determination device according to claim 4, wherein when the carrier comprises two switched antennas, the control law being a square signal.

6. The determination device according to claim 1, wherein the movement module is able to control at least one mechanical actuator of the carrier and/or of the or each antenna, so as to generate a mechanical movement of the apparent phase center according to the control law.

7. The determination device according to claim 1, wherein said component of the attitude of the carrier corresponds to the heading angle, to the roll angle or to the pitch angle of the carrier.

8. The determination device according to claim 7, wherein the control law defines a displacement of the apparent phase center along a longitudinal axis of the carrier when the determination of the heading and the pitch angles is required.

9. The determination device according to claim 7, wherein the control law defines a displacement of the apparent phase center along a transverse axis of the carrier when the determination of the roll angle is required.

10. The determination device according to claim 1, wherein the vector of interest corresponds to the absolute direction of displacement of the apparent phase center.

11. A system for assisting with the piloting of a carrier, comprising:

a GNSS receiver apt to provide an observable value;

one or a plurality of antennas arranged in known positions with respect to the carrier and defining an apparent phase center;

a device for determining the attitude of a carrier, according to claim 1.

12. A method for determining the attitude of a carrier, the carrier comprising a GNSS receiver apt to receive GNSS signals from one or a plurality of antennas arranged in known positions with respect to the carrier and defining an apparent phase center, the GNSS receiver being apt to supply an observable value determined from the received GNSS signals;

the method comprising:

determination of a control law of the apparent phase center;

setting the apparent phase center in movement according to the control law;

determination of an absolute orientation of a vector of interest from at least one observable value provided by the GNSS receiver and from the control law; and determination of at least one component of the attitude of the carrier, from the absolute orientation of the determined vector of interest;

wherein the setting the apparent phase center in movement is carried out by:

(i) controlling at least one mechanical actuator of the carrier and/or of at least one antenna to physically displace the apparent phase center according to the control law, or (ii) controlling an electronic radio-frequency multiplexer having a plurality of antenna inputs and a single output, the output being connected to the antenna assigned by the control law, and wherein when the observable value is a measurement of the resolved velocity of the carrier, the vector of interest is determined from the following relationship:

$$\delta V=b(t)\cdot(d_X,d_Y,d_Z)^T$$

where $\delta V$ is a resolved velocity deviation vector;

$b(t)$ is a function dependent on the control law; and $(d_X,d_Y,d_Z)^T$ is the vector of interest.

* * * * *